United States Patent [19]
Jakob et al.

[11] Patent Number: 5,777,015
[45] Date of Patent: Jul. 7, 1998

[54] DISPERSION POWDERS FOR WATER-RESISTANT ADHESIVES

[75] Inventors: Martin Jakob, Kelkheim; Volker Matz, Frankfurt; Hermann Schindler, Eppstein, all of Germany

[73] Assignee: Clariant GmbH, Frankfurt, Germany

[21] Appl. No.: 760,074

[22] Filed: Dec. 4, 1996

[30] Foreign Application Priority Data

Dec. 7, 1995 [DE] Germany ............ 195 45 608.4

[51] Int. Cl.$^6$ .................. C08K 5/07; C08L 29/04
[52] U.S. Cl. .................. 524/354; 524/355; 524/503; 525/57; 525/61
[58] Field of Search .................. 524/354, 355, 524/503; 525/57, 61

[56] References Cited

U.S. PATENT DOCUMENTS

| | | |
|---|---|---|
| 4,118,357 | 10/1978 | Brabetz et al. |
| 4,663,377 | 5/1987 | Hombach et al. .............. 524/196 |
| 5,545,684 | 8/1996 | Jakob et al. .............. 524/354 |

FOREIGN PATENT DOCUMENTS

| | | |
|---|---|---|
| 44 02 408 | 8/1995 | Germany. |
| 44 02 409 | 8/1995 | Germany. |
| 1 440 337 | 12/1973 | United Kingdom. |

OTHER PUBLICATIONS

Jaffe et al., "Polyvinyl Acetate Emulsions for Adhesives", Handbook of Adhesives, 3rd edition.
Abstract of JP-0-7157565-A, "Redispersible Synthetic Resin Emulsion Powder —Containing Acetoacetyl Group, MFR by Emulsion Polymerisation", (1995).

Abstract of 1179-278-A, "Powdered Wood Adhesive with Improved Initial Bond Strength —Contains Powders of Methylolated Melamine and Unsaponified Ethylene–Vinyl Acetate Copolymer", (1986).

*Primary Examiner*—John M. Cooney, Jr.
*Attorney, Agent, or Firm*—Foley & Lardner

[57] ABSTRACT

A redispersible dispersion powder comprising:
a) a base polymer selected from the group consisting of vinyl ester homo- and copolymers.
b) from 2 to 20% by weight, based on the overall mass of the base polymer a), of polyvinyl alcohol, said polyvinyl alcohol having a degree of hydrolysis of from 70 to 100 mol-% and a viscosity in a 4% aqueous solution of from 2 to 70 mPa.s.
c) from 0 to 50% by weight, based on the overall mass of the components a) and b), of anticaking agent.
d) from 0.001 to 5% by weight, based on the overall mass of the components a) and b), of water- soluble, at least bifunctional, masked aldehydes having at least 3 carbon atoms, said masked aldehydes being capable of controllably releasing aldehyde groups in an acidic medium.
e) from 0 to 25% by weight, based on the overall mass of the base polymer a), of additives selected from the group consisting of film-forming auxiliaries and plasticizers, and
f) from 0 to 10% by weight, based on the overall mass of the components a) and b), of free Brönsted or Lewis acids which are present as solids or adsorbed on a carrier material.

11 Claims, No Drawings

DISPERSION POWDERS FOR WATER-RESISTANT ADHESIVES

BACKGROUND OF THE INVENTION

1. Field of the Invention

The present invention relates to dispersion powders stabilized by protective colloids, to processes for the preparation of these powders, to the preparation of stable redispersions of these dispersion powders, and to their use in adhesives.

2. Description of the Related Art

Dispersion powders, especially of homo- and copolymeric polyvinyl acetate, which are stabilized with protective colloids such as polyvinyl alcohol, have been used for many years as a constituent in the preparation of adhesive compositions, for example, as tile adhesives or wallpaper pastes. Dispersion powders are usually prepared by spray drying aqueous polymer dispersions, in most cases with the addition of auxiliaries, such as anticaking agents, and subsequently added polyvinyl alcohol. Redispersions of dispersion powders, which consist predominantly of polyvinyl esters, especially polyvinyl acetate, and which are stabilized with protective colloids, especially polyvinyl alcohol, are also suitable as white glues for bonding wood and other porous materials. The adhesive bonds obtained with the redispersions are usually equivalent in their dry bonding strengths to adhesive bonds produced from conventional dispersion adhesives of comparable composition.

In general, dispersions of polyvinyl esters, especially polyvinyl acetate, which are used as white glues for gluing wood and other porous substrates, are described extensively in the patent literature and in technical monographs, for example, in Handbook of Adhesives, 3rd Edition, Chapter 21, page 381. A fundamental deficiency of the above-mentioned adhesives, whether in the form of a dispersion adhesive or redispersion of a dispersion powder, is the susceptibility of the adhesive bonds to water, which is due to the presence of hydrophilic stabilizers, especially polyvinyl alcohol. This has the consequence that, in general it is not possible to use such systems to produce water-resistant bonds which meet required standards.

In order to improve the water resistance of dispersion powder compositions, DE-A 44 02 408 proposes the use of silicon-containing comonomers during the emulsion polymerization of the dispersion which is to be sprayed. DE-A 44 02 409 describes the addition of silicon compounds in the form of an emulsion to the dispersion, prior to spray drying. Redispersible dispersion powders of enhanced water stability are obtained, according to JP-A 157 565/95, by using acetoacetylated polyvinyl alcohols as a protective colloid during the preparation of the dispersion. Pulverulent mixtures of melamine resins with dispersion powders of vinyl acetate-ethylene copolymers can be used, according to JP-A 179 278/86, as wood adhesives with enhanced water resistance.

The patent literature, moreover, cites methods of improving the water resistance of polyvinyl ester dispersions. For example, increased water resistances can be attained by copolymerization of crosslinkable comonomers, such as N-methylol(meth)acrylamide as disclosed in DE-C 26 20 738, or subsequently added crosslinking agents, such as formaldehyde resins taught in DE-B 22 61 402 or isocyanate compounds as in EP-A 206 059. The preparation of dispersion powders from these systems, however, generally leads to unsatisfactory results owing to the high reactivity of the crosslinking agents.

DE-A 44 20 484 (non-prior art) proposes dispersion adhesives having a pot life close to that required in practice, and whose films are of enhanced water resistance, comprising a homo- or copolymeric polyvinyl ester, polymeric protective colloids, water-soluble compounds which can be complexed with the polymeric protective colloids, and at least partially masked polyaldehydes, from which it is possible to bring about controlled release of aldehyde groups in an aqueous-acidic medium.

Pulverulent adhesive compositions whose redispersions, prepared by the end user by stirring with water, form films which are equivalent in terms of water stability to the adhesive dispersion systems described in the above-mentioned documents. Such pulverulent adhesive compositions possess both a comparable set of performance properties along with other advantages, for example, lower transportation weights and easier disposal of containers.

SUMMARY OF THE INVENTION

Accordingly, an object of the present invention was to provide redispersible dispersion powders, processes for the preparation of these powders, redispersions of these dispersion powders and processes for their preparation, and to the use of redispersions in adhesives.

In accordance with these and other objectives, there is provided a redispersible dispersion powder comprising:

a) a base polymer selected from the group consisting of vinyl ester homo- and copolymers, b) from 2 to 20% by weight, based on the overall mass of the base polymer a), of polyvinyl alcohol, said polyvinyl alcohol having a degree of hydrolysis of from 70 to 100 mol-% and a viscosity in a 4% aqueous solution of from 2 to 70 mPa.s, c) from 0 to 50% by weight, based on the overall mass of the components a) and b), of anticaking agent, d) from 0.001 to 5% by weight, based on the overall mass of the components a) and b), of water- soluble, at least bifunctional, masked aldehydes having at least 3 carbon atoms, said masked aldehydes being capable of controllably releasing aldehyde groups in an acidic medium, e) from 0 to 25% by weight, based on the overall mass of the base polymer a), of additives selected from the group consisting of film-forming auxiliaries and plasticizers, and f) from 0 to 10% by weight, based on the overall mass of the components a) and b), of free Brönsted or Lewis acids which are present as solids or adsorbed on a carrier material.

In further accordance with these objectives, there is provided a process for preparing a redispersible dispersion powder comprising obtaining a dispersion comprising the base polymer a), which may optionally be stabilized with a portion of the polyvinyl alcohol b), adding the remainder of the polyvinyl alcohol b) and, optionally one or more of said components e) to form a mixture, drying said mixture, with the optional addition of said anticaking agent c), and adding the masked polyaldehydes d) and, optionally, the acid f).

There is also provided in accordance with these objectives, redispersions and adhesives prepared using redispersible dispersion powders.

In yet further accordance with the objectives, there is provided a process for preparing a redispersion from a redispersible dispersion powder, comprising stirring the redispersible dispersion powder with water.

3

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

The redispersions of a dispersion powder according to the present invention can preferably be used as adhesives to produce adhesive bonds which possess high water resistance and which permit, for example, compliance with test standards for water-resistant adhesives, such as those of DIN EN 204. It has been found that a pulverulent composition which consists essentially of a polyvinyl ester base polymer in combination with one or more at least partially masked, at least bifunctional, water-soluble aldehyde compounds which in an acidic medium in the redispersion give controlled release of aldehyde groups, and of acid donor compounds is generally capable of being used as an adhesive and produces adhesive bonds which generally possess high water resistance.

The present invention is directed toward a redispersible dispersion powder comprising a) a base polymer from the group consisting of vinyl ester homo- and copolymers, b) from 2 to 20% by weight, based on the overall mass of the base polymer a), of polyvinyl alcohol having a degree of hydrolysis of from 70 to 100 mol-% and a viscosity of the 4% aqueous solution of from 2 to 70 mPa.s, c) from 0 to 50% by weight, based on the overall mass of the polymer components a) and b), of anticaking agent, d) from 0.001 to 5% by weight, based on the overall mass of the polymer components a) and b), of water-soluble, at least bifunctional, masked aldehydes having at least 3 carbon atoms, from which it is possible to bring about controlled release of aldehyde groups in an acidic medium, e) from 0 to 25% by weight, based on the overall mass of the base polymer a), of further additives from the group consisting of film-forming auxiliaries and plasticizers, and f) from 0 to 10% by weight, based on the overall mass of the polymer components a) and b), of free Brönsted or Lewis acids which are present as solids or adsorbed on a carrier material.

Suitable base polymers a) are preferably homo- or copolymers, preferably having a vinyl ester fraction of at least 50% by weight. Examples of suitable vinyl esters include, for example, vinyl formate, vinyl acetate, vinyl propionate, vinyl isobutyrate, vinyl pivalate, vinyl 2-ethylhexanoate, vinyl esters of saturated branched monocarboxylic acids having 9 to 10 carbon atoms in the acid radical, vinyl esters of relatively long-chain saturated or unsaturated fatty acids, for example, vinyl laurate and vinyl stearate. Among these, the exclusive use of vinyl acetate, to form a homopolymer, is particularly preferred. Monomers which can be copolymerized with the vinyl esters include, in particular, ethylene, and also α,β-unsaturated carboxylic acids, such as, acrylic acid, methacrylic acid, and the esters thereof with primary and secondary, saturated, monohydric alcohols having 1 to 18 carbon atoms, for example, methanol, ethanol, propanol, butanol, 2-ethylhexyl alcohol, cycloaliphatic alcohols and relatively long-chain fatty alcohols. It is also possible to use, at the same time, α,β-unsaturated dicarboxylic acids, such as, maleic acid, fumaric acid, itaconic acid or citraconic acid, and their mono- or diesters with saturated monohydric aliphatic alcohols having 1 to 18 carbon atoms. Also suitable as base polymers include heterogeneous polyvinyl ester polymers prepared by mixing dispersions of different polyvinyl ester compositions, such as those described in DE-A 44 31 343. It is particularly preferred to employ homopolymeric polyvinyl esters, especially polyvinyl acetate, or vinyl acetate ethylene copolymers having an ethylene fraction of preferably from 2 to 50% by weight. Mixtures of two or more of the above polymers can also be used.

Suitable components b) may include polyvinyl alcohols having a degree of hydrolysis of from 70 to 100 mol-% and a viscosity in a 4% aqueous solution of from 2 to 70 mPa.s. Preference is given to the use of polyvinyl alcohols having a degree of hydrolysis of from 80 to 94 mol-% and a viscosity of the 4% aqueous solution of from 2 to 30 mPa.s. The quantity thereof is preferably from 2 to 20% by weight, based on the overall mass of the base polymer a).

Suitable anticaking agents c) may include, for example, aluminum silicates, kieselguhr, colloidal silica gel, pyrogenic silica, kaolin, clays, light spar, magnesium hydrosilicates, talc, cements, diatomaceous earth, precipitated silicic acids, hydrophobically modified silicic acids or hydrophobically modified silica according to DE-C 31 01 313. The mean particle sizes of the anticaking agents preferably ranges from 0.01 to 50 μm, in particular from 0.01 to 15 μm. The quantity in which the optional anticaking agents are used is preferably from 0 to 30% by weight, based on the overall mass of the polymer components a) and b).

As component d) it is preferred to employ from 0.1 to 1.5% by weight, based on the overall mass of the polymer components a) and b). Component d) preferably comprises masked aldehydes which are at least bifunctional, have at least 3 carbon atoms and are soluble in water to an extent of at least 0.001% by weight, and from which it is possible in an acidic medium to bring about controlled release of aldehyde groups which are capable of crosslinking. Suitable examples of component d) include derivatives of malonaldehyde, succinaldehyde, 2-hydroxysuccinaldehyde, glutaraldehyde, 3-methylglutaraldehyde, 3-hydroxyglutaraldehyde, adipaldehyde, heptanedial, octanedial, nonanedial, decanedial and also cis- and trans-2-butenedial or polyacroleine, and dialdehyde starches. Suitable derivatives of these aldehydes include the fully or partially formed adducts of the aldehydes with alkali metal hydrogen sulfites, their full acetals with methanol or ethanol, and their cyclic full acetals with ethylene glycol or propylene glycol. It is also possible for the acetals to carry further, non-masked aldehyde groups. Likewise suitable are the intramolecular cyclic acetals of succinaldehyde and glutaraldehyde, such as, 2,5-dialkoxytetrahydrofuran and 2,6-dialkoxytetrahydro-2H-pyran. The bisadducts of sodium or potassium hydrogen sulfite with these aldehydes are preferred. Particularly preferred components include the pulverulent bisadducts of sodium or potassium hydrogen sulfite with glutaraldehyde and succinaldehyde, especially glutaraldehyde bis(sodium hydrogen sulfite) and succinaldehyde bis(sodium hydrogen sulfite). It is of course also possible to employ mixtures of different adducts. Other preferred compounds include the bisdimethyl and bisdiethyl acetals of malonaldehyde, and the intramolecular cyclic acetals of succinaldehyde and glutaraldehyde.

As optional component e) use may be made of further additives, such as film-forming auxiliaries, for example butyldiglycol acetate, plasticizers, defoamers and, if desired, other additives. If component e) is employed, it is preferably present from 0.1 to 5% by weight, based on the overall mass of the base polymer a).

As acidic components f), the novel dispersion powders comprise preferably from 0.1 to 5% by weight, based on the overall mass of the polymer components a) and b), of Brönsted or Lewis acids which are soluble in water and are present in solid form or adsorbed on a carrier material, such as alumino silicates. The compounds preferably used as component f) include those which are able in the widest sense to form complex compounds with the polyvinyl alcohol. The Brönsted acids used are preferably those capable of forming polyanions, for example, boric acid, metaphosphoric acid or acidic crystalline salts of orthophosphoric acid. Suitable Lewis acids capable of being used include crystalline salts with polyvalent cations, especially salts of Al(III), Zr(IV) or Fe(III), for example, aluminum chloride, aluminum nitrate, zirconium oxychloride or iron (III)chloride. Other Brönsted acids having $pK_a$ values of below 2.5, such as, for example, benzene sulfonic acid or p-toluene sulfonic acid, can be used together with the above-mentioned acids, if necessary to establish a low pH. It is of course possible to use mixtures of the abovementioned compounds.

The invention additionally provides a process for the preparation of redispersible dispersion powders starting from a dispersion which comprises the base polymer a), and which may have already been stabilized with some of the polyvinyl alcohol b) to be employed. To this mixture, the remainder of the polyvinyl alcohol b) to be employed is added, and, if desired, also one or more components e). The process comprises carrying out drying, with the optional addition of anticaking agent c) and subsequent addition of the masked polyaldehydes d) and, if desired, the acid f).

The preparation of the novel dispersion powders for water-resistant adhesives starts from a dispersion comprising the polyvinyl ester base polymer a), which dispersion may have already been stabilized with some or all of the polyvinyl alcohol b) used. The latter may also be added to the dispersion subsequently, preferably in the form of an aqueous solution. If desired, one or more components from group e) may be added to the dispersion; in particular in the case where a pure polyvinyl acetate homopolymer dispersion is used, customary film-forming auxiliaries may be added to lower the MFT (minimum film-forming temperature). In this context, the sequence of the mixing operations is not critical.

The dispersion mixture is subsequently dried, preferably by spray drying or freeze drying, and in particular, the mixture is spray dried. Especially in those cases where the dispersion mixtures have a very low minimum film-forming temperature, for example of $\leq 0°$ C., the anticaking agent c) should preferably be added in the course of spray drying, among other things, to aid in ensuring the dispersion powders possess an appropriate shelf life. The anticaking agent may be fed into a spray-drying tower simultaneously with, but separately from, the aqueous dispersion mixture. From the aqueous mixtures of the two polymer dispersions, the dispersion powders which are the aim of the invention may be prepared by spray drying. This spray drying is carried out using any devices known to the person skilled in the art which are suitable for the spray drying of liquids. Examples include, for example, devices operating with dual-substance nozzles or with a rotating atomizer disk. During the spraying procedure, the temperature of the dry gas is preferably maintained from 60° C. to 180° C., most preferably from 90° C. to 150° C.

The dispersion mixture which has preferably been spray-dried, is then preferably admixed with the masked polyaldehydes d) and, if desired, with the acidic components f), either simultaneously or in succession. The mixing operation can be carried out in mixers known to the person skilled in the art and customary for this purpose, such as, mixing drums, tumble mixers or stirring mixers. The sequence of addition of components d) and f) is not critical here.

One variant of this embodiment for preparation of the novel dispersion powders is to admix the masked polyaldehydes d), preferably in the form of aqueous solutions, or as solids, to the polyvinyl ester dispersion even prior to the drying process. This operation can be carried out at any time prior to or following the addition of components b) and e), and is not critical. In the case of spray drying, the temperature of the dry gas is then preferably chosen so that the thermal decomposition temperature of the masked polyaldehyde compounds is not exceeded. For example, when using glutaraldehyde bis(sodium hydrogen sulfite), as a preferred compound from group d), the temperature of the gas stream should preferably not exceed a level of 120° C. After the drying operation, the acidic component f) can be admixed to the pulverulent composition.

The dispersion powders prepared in accordance with the invention have a surprisingly good shelf life and possess good free-flow properties.

The invention provides, furthermore, a process for the preparation of redispersions from the novel dispersion powder compositions, which are suitable as water-resistant adhesives.

If the initial dispersion powder already contains component f), stirring with water leads directly to a redispersion which can be employed as one-component adhesive. The dispersion preferably has an acidic pH which is in a range in which the masked polyaldehydes d) are slowly hydrolyzed, and the aldehyde groups can be released at a controlled rate over time. This pH range is preferably between 2 and 6, in particular between 2.5 and 4.

Alternately, it is possible for the acidic component f) in a two-component or two-pack system not to be added to the redispersion of the pulverulent adhesive composition until during or after the operation of redispersing the powder mixture. According to this embodiment, component f) may be added with or without additional- acids, preferably Brönsted acids, such as organic acids or mineral acids having $pK_a$ values of less than 2.5. In this case component f) is preferably added in the form of its aqueous solution.

This invention provides for the use of the novel dispersion powders in adhesives, preferably in water-resistant adhesives.

The products obtained from the redispersions of the novel dispersion powder compositions are suitable as adhesives, especially for gluing wood, and in this application it is possible to attain excellent wet bonding strengths within practical pot lives of at least 8 hours. When used as a wood glue, it is also possible for redispersions according to the present invention to meet the requirements, in accordance with test standard DIN EN 204, of at least group D2, preferably D3 and in particular of test standard D4. They are therefore particularly suitable for interior use in areas subject to extreme fluctuations in climatic conditions and to the action of water, for example, around indoor swimming pools and in shower cubicles. The present redispersions are also suitable for exterior applications where climatic effects are great, for example on windows and external doors. Redispersions according to the present invention are exceptionally suitable for use, moreover, in high-frequency gluing.

Examples of further applications of the novel pulverulent compositions include water-resistant bonds of paper, cardboard, corrugated cardboard, foam material, leather, textile composites or compressed composites, such as, floor, wall or ceiling adhesives, as furniture film or carpet-backing adhesives, tile adhesives for surfaces not sensitive to acid, water-resistant binders for fiber board or reconstituted leather, as binders for insulating materials comprising paper or polymer fibers, or as binders for woven and nonwoven textiles.

Other areas of application include building materials containing inorganic binders. Examples include plaster materials, which are able to set at a predetermined pH.

The examples which follow are intended to illustrate the invention. The parts and percentages indicated in the examples are by weight unless noted otherwise.

EXAMPLES

Preparation of pulverulent adhesives

Example 1

100 parts of ®Mowilith-Pulver DS (polyvinyl acetate powder stabilized with polyvinyl alcohol; Hoechst AG) were admixed with 1 part of glutaraldehyde bis(sodium hydrogen sulfite) and 2.6 parts of aluminum chloride hexahydrate, and these components were mixed in a tumble mixer.

Example 2

2 parts of butyldiglycol acetate were stirred into 100 parts of a commercially available homopolymeric polyvinyl acetate dispersion stabilized with about 10% (based on polyvinyl acetate) of partially hydrolyzed polyvinyl alcohol. The dispersion was subsequently diluted to a solids content of 37% and spray dried with the aid of a disk atomizer (from Niro) using 1%, based on the solids content, of a commercially available anticaking agent (hydrophobicized silicic acid with a particle size of 10 μ). Spraying conditions: entry temperature=125° C., exit temperature=75° C., dry-gas throughput=900 m$^3$/h, product throughput=20 kg/h, rotary speed of the atomizer disk=23,000 rpm.

100 parts of the powder obtained in this way, which has good free-flow properties, were subsequently admixed with 1 part of glutaraldehyde bis(sodium hydrogen sulfite) and 2.6 parts of aluminum chloride hexahydrate, and these components were mixed in a tumble mixer.

Example 3

74.5 parts of a commercially available homopolymeric polyvinyl acetate dispersion stabilized with about 10% (based on polyvinyl acetate) of partially hydrolyzed polyvinyl alcohol were mixed, using a paddle stirrer, with 25.5 parts of a stabilized vinyl acetate-ethylene dispersion which had been stabilized with about 10% (based on the overall quantity of polymer) of partially hydrolyzed polyvinyl alcohol and had an ethylene content of about 25% and a freezing temperature of −10° C. The dispersion was subsequently spray dried under the conditions specified in Example 2 with the aid of a spraying tower, using a rotating atomizer disk.

100 parts of the powder thus obtained, which had good free-flow properties, were admixed with 1 part of glutaraldehyde bis(sodium hydrogen sulfite) and 2.6-parts of aluminum chloride hexahydrate, and these components were mixed in a tumble mixer.

Example 4

Storage test:
The powder composition of Example 3 was stored at room temperature for 9 months.
Preparation of redispersions suitable as wood glue from Examples 1 to 4

The powder compositions from Examples 1 to 4 proved to be readily redispersible and led to coagulum-free redispersions. Water was added and mixed in to produce 50% redispersions with pH values in the range between 2.8 and 3.5. The MFT (minimum film-forming temperature) for Examples 2 and 3 was 5° C. and, respectively, 0° C. As a comparison example, a 30% redispersion was prepared from Mowilith-Pulver DS without further additives (Comparison Example V1).

Performance testing of the redispersions as wood adhesive
Wood glue testing was carried out in accordance with DIN EN 204/D4. The test specimens are prepared by the procedure of DIN EN 205. Gluing and testing are carried out under the following parameters:
Glue application: 150±20 g/m$^2$ to both sides
Open waiting time: 3 minutes
Closed waiting time: 3 minutes
Press time: 2 hours
Press pressure: 0.7±0.1 N/mm$^2$
Number of specimens per test series: 20
Storage sequence D4/5: 7 days standard conditions*
6 hours in boiling water
2 hours in cold water
Test temperature: 23° C.±2° C.
Rate of advance: 50 mm/min.
Classification into group D4/5 is made for a tear strength of >4 N/mm$^2$.
Standard conditions: *23°±2° C. and 50±5% relative atmospheric humidity.
Table 1 lists the wet bond strengths in accordance with DIN EN 204/D4. It also gives the viscosities measured at 23° C. (Brookfield RVT, spindle 6, 20 rpm) of the redispersions obtained, and their viscosities after a period of 8 hours had elapsed.

TABLE 1

Performance testing data of the redispersions from Examples 1 to 4 and V1

| Example | Viscosity [Pa · s] | Viscosity [Pa · s] after 8 hours | D4/5 [N/mm$^2$] |
|---|---|---|---|
| 1 | 12.1 | 14 | 4.8 |
| 2 | 20.5 | 24.0 | 7.2 |
| 3 | 19.3 | 17.9 | 6.2 |
| 4 | 30 | 35 | 4.1 |
| V1 | 11.2 | 12 | all specimens failed |

It is evident from this table that only Examples 1 to 4 lead to adhesive bonds which are resistant to boiling water and comply with test standard D4/5, while Comparison Example V1, without the use of the novel components d) and f), exhibits no water resistance whatsoever.

The priority document German Application 195 608.4 filed Dec. 7, 1995 is incorporated herein in its entirety by reference including the title, abstract, specification and claims.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A redispersible dispersion powder comprising:
   a) a base polymer selected from the group consisting of vinyl ester homo- and copolymers,
   b) from 2 to 20% by weight, based on the overall mass of the base polymer a), of polyvinyl alcohol, said polyvinyl alcohol having a degree of hydrolysis of from 70 to 100 mol-% and a viscosity in a 4% aqueous solution of from 2 to 70 mPa.s,
   c) from 0 to 50% by weight, based on the overall mass of the components a) and b), of anticaking agent,
   d) from 0.001 to 5% by weight, based on the overall mass of the components a) and b), of water-soluble, at least bifunctional, masked aldehydes having at least 3 carbon atoms, said masked aldehydes being capable of controllably releasing aldehyde groups in an acidic medium,
   e) from 0 to 25% by weight, based on the overall mass of the base polymer a), of additives selected from the group consisting of film-forming auxiliaries and plasticizers, and
   f) from 0 to 10% by weight, based on the overall mass of the components a) and b), of free Brönsted or Lewis acids which are present as solids or adsorbed on a carrier material,
wherein the base polymer a) is a homo- or copolymer having a vinyl ester fraction of at least 50% by weight.

2. A redispersible dispersion powder as claimed in claim 1, comprising from 0.1 to 0.5% by weight, based on the components a) and b), of said masked aldehydes d).

3. A redispersible dispersion powder as claimed in claim 2, wherein the masked aldehydes d) comprise derivatives of glutaraldehyde and succinaldehyde.

4. A redispersible dispersion powder as claimed in claim 1, wherein the masked aldehydes d) comprise glutaraldehyde bis(sodium hydrogen sulfite) or succinaldehyde bis (sodium hydrogen sulfite).

5. A redispersible dispersion powder as claimed in claim 1, comprising from 0.1 to 5% by weight of said acid f), based on the overall mass of the components a) and b).

6. A redispersible dispersion powder as claimed in claim 1, wherein said acid f) is selected from the group consisting of meta-phosphoric acid, acidic crystalline salts of orthophosphoric acid, aluminum chloride, aluminum nitrate, zirconium oxychloride and iron(III)chloride.

7. A process for preparing a redispersible dispersion powder comprising:
   a) a base polymer selected from the group consisting of vinyl ester homo- and copolymers,
   b) from 2 to 20% by weight, based on the overall mass of the base polymer a), of polyvinyl alcohol, said polyvinyl alcohol having a degree of hydrolysis of from 70 to 100 mol-% and a viscosity in a 4% aqueous solution of from 2 to 70 mPa.s,
   c) from 0 to 50% by weight, based on the overall mass of the components a) and b), of anticaking agent,
   d) from 0.001 to 5% by weight, based on the overall mass of the components a) and b), of water- soluble, at least bifunctional, masked aldehydes having at least 3 carbon atoms, said masked aldehydes being capable of controllably releasing aldehyde groups in an acidic medium,
   e) from 0 to 25% by weight, based on the overall mass of the base polymer a), of additives selected from the group consisting of film-forming auxiliaries and plasticizers, and
   f) from 0 to 10% by weight, based on the overall mass of the components a) and b), of free Brönsted or Lewis acids which are present as solids or adsorbed on a carrier material,
said process comprising:
   obtaining a dispersion comprising the base polymer a), which may optionally be stabilized with a portion of the polyvinyl alcohol b),
   adding the remainder of the polyvinyl alcohol b) and, optionally one or more of said components e) to form a mixture,
   drying said mixture, with the optional addition of said anticaking agent c), and
   adding the masked polyaldehydes d) and, optionally, the acid f).

8. A process for the preparation of a redispersible dispersion powder as claimed in claim 7, further comprising:
   admixing the masked aldehydes d), in the form of aqueous solutions, or as solids, with the mixture prior to the drying step, and wherein the temperature in the drying step does not exceed the decomposition temperature of the masked aldehydes d).

9. A process for preparing a redispersion from a redispersible dispersion powder as claimed in claim 5, comprising:
   stirring the redispersible dispersion powder with water.

10. A process for the preparation of a redispersion from a redispersible dispersion powder comprising:
   a) a base polymer selected from the group consisting of vinyl ester homo- and copolymers,
   b) from 2 to 20% by weight, based on the overall mass of the base polymer a), of polyvinyl alcohol, said polyvinyl alcohol having a decree of hydrolysis of from 70 to 100 mol-% and a viscosity in a 4% aqueous solution of from 2 to 70 mPa.s,
   c) from 0 to 50% by weight, based on the overall mass of the components a) and b), of anticaking agent,
   d) from 0.001 to 5% by weight, based on the overall mass of the components a) and b), of water- soluble, at least bifunctional, masked aldehydes having at least 3 carbon atoms, said masked aldehydes being capable of controllably releasing aldehyde groups in an acidic medium,
   e) from 0 to 25% by weight, based on the overall mass of the base polymer a), of additives selected from the group consisting of film-forming auxiliaries and plasticizers, and
   f) from 0 to 10% by weight, based on the overall mass of the components a) and b), of free Brönsted or Lewis acids which are present as solids or adsorbed on a carrier material,
said process comprising:
   stirring the redispersible dispersion powder with water to obtain redispersion of said powder, and
   adding from 0 to 10% by weight, based on the overall mass of the components a) and b), of free Brönsted or Lewis acids which are present as solids or adsorbed on a carrier material during or after the redispersion of the redispersible dispersion powder.

11. A redispersible dispersion powder according to claim 1, wherein component d) comprises the pulverulent bisadducts of sodium or potassium hydrogen sulfite with glutaraldehyde and succinaldehyde.

* * * * *